(12) United States Patent
Nagarekawa et al.

(10) Patent No.: US 7,497,594 B2
(45) Date of Patent: Mar. 3, 2009

(54) ILLUMINATING DEVICE AND PROJECTOR

(75) Inventors: Satoru Nagarekawa, Matsumoto (JP);
Hisashi Iechika, Shiojiri (JP);
Hisamaro Kato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/686,716

(22) Filed: Mar. 15, 2007

(65) Prior Publication Data

US 2007/0230157 A1    Oct. 4, 2007

(30) Foreign Application Priority Data

Mar. 28, 2006    (JP) .............................. 2006-088299

(51) Int. Cl.
*F21S 8/00* (2006.01)
(52) U.S. Cl. ...................... 362/268; 362/293
(58) Field of Classification Search ................. 362/268, 362/293, 307, 308
See application file for complete search history.

(56) References Cited

U.S. PATENT DOCUMENTS 7,370,992 B2 *   5/2008  Cheng et al. ................ 362/293

2007/0206166 A1 *   9/2007  Wu ............................. 353/102

FOREIGN PATENT DOCUMENTS

| JP | A 2-253291 | 10/1990 |
|---|---|---|
| JP | A 10-161241 | 6/1998 |
| JP | A 2000-348532 | 12/2000 |

* cited by examiner

*Primary Examiner*—Thomas M Sember
(74) *Attorney, Agent, or Firm*—Oliff & Berridge, PLC

(57) ABSTRACT

An illuminating device includes: a lamp device that includes a lamp body, which is a light source, and a concave reflector for reflecting light emitted from the lamp body; and a lens member that has a planar optical surface and a nonplanar optical surface opposite to the planar optical surface and is provided on an emission side of the lamp device. In the illuminating device, the lens member is arranged such that a normal line of the planar optical surface is slightly inclined at a predetermined angle with respect to an optical axis of the lamp device. The lens member is arranged such that light beams substantially parallel to the optical axis are incident on the planar optical surface, and a filter that reflects at least one of an ultraviolet ray and an infrared ray is provided on the planar optical surface.

10 Claims, 4 Drawing Sheets

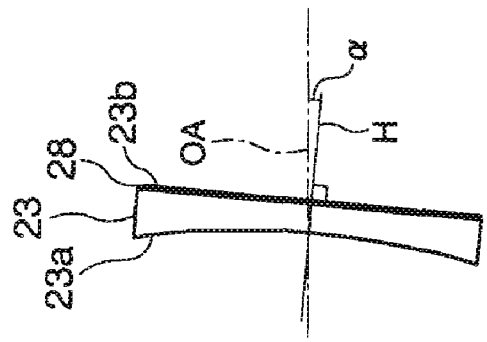
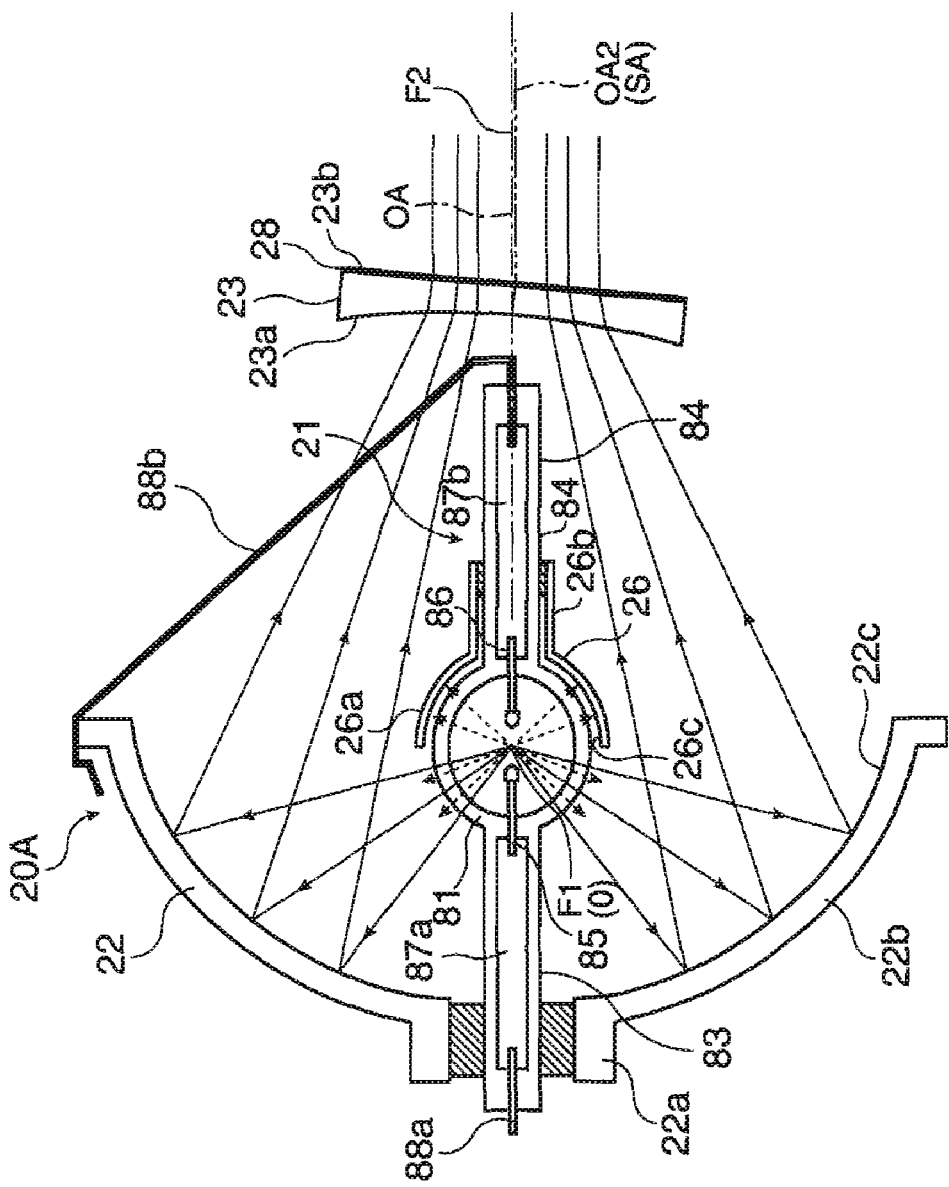

ILLUMINATING DEVICE AND PROJECTOR

BACKGROUND

1. Technical Field

The present invention relates to an illuminating device using a lamp and a projector provided with a light modulating device, such as a liquid crystal display panel, illuminated by the illuminating device.

2. Related Art

There has been proposed an optical system for a projector that includes a pair of dichroic mirrors for separating white light emitted from a projecting light source into red, blue, and green light beams, an optical path refracting mirror, serving as an infrared ray filter provided on an optical path of the separated red light beam, and an optical path refracting mirror, serving as an ultraviolet ray filter provided on an optical path of the separated blue light beam (see JP-A-2-253291).

Further, there has been proposed another optical system for a projector in which a pair of fly eye lenses for uniformizing light are arranged in front of a light source lamp, one surface of a front fly eye lens on which light is incident is a convex surface, and a filter for reflecting infrared rays is formed on the convex surface (see JP-A-10-161241).

In the former optical system, a filter is formed on an inclined mirror arranged on an optical path of the separated light beam. In this case, generally, the inclined mirror is inclined at an angle of 45° with respect to an optical axis. In this structure, the area of the filter needs to be $2^{1/2}$ times larger than that when the filter is arranged orthogonal to the optical axis. That is, it is necessary to increase the area of the filter as the tilt angle of the mirror becomes larger, which results in an increase in manufacturing costs.

In the latter optical system, the filter is formed on the convex surface of the fly eye lens. In this case, since light is incident on the filter at various angles, the filter may not filter some light beams. That is, the filtering efficiency of the filter is lowered, which causes an increase in the amount of ultraviolet rays or infrared rays passing through the filter.

SUMMARY

An advantage of some aspects of the invention is that it provides an illuminating device capable of blocking infrared rays or ultraviolet rays using a filter having a small area.

Another advantage of some aspects of the invention is that it provides a projector provided with the illuminating device.

According to an aspect of the invention, an illuminating device includes: a lamp device that includes a lamp body, which is a light source, and a concave reflector that reflects light emitted from the lamp body; and a lens member that has a planar optical surface and a nonplanar optical surface opposite to the planar optical surface and is provided on an emission side of the lamp device. In the illuminating device, the lens member is arranged such that a normal line of the planar optical surface is slightly inclined at a predetermined angle with respect to an optical axis of the lamp device. The lens member is arranged such that light beams substantially parallel to the optical axis are incident on the planar optical surface, and a filter that reflects at least one of an ultraviolet ray and an infrared ray is provided on the planar optical surface.

In the illuminating device according to the above-mentioned aspect, the mirror that reflects at least one of an ultraviolet ray and an infrared ray is provided on the planar optical surface (hereinafter, referred to as a 'planar surface') of the lens member. Therefore, it is possible to block at least one of the ultraviolet ray and the infrared ray among light beams emitted from the lamp device. In addition, since light beams substantially parallel to the optical axis of the lamp device are incident on the planar surface of the lens member having the filter formed thereon, the efficiency of the filter is not lowered. Therefore, it is possible to prevent a device to be illuminated by the illuminating device or optical elements on an illumination optical path from being chemically damaged due to ultraviolet rays or infrared rays, and thus to prevent defects in the device to be illuminated or the optical elements.

In this structure, the normal line of the planar surface having the filter formed thereon is inclined at a very small angle with respect to the optical axis of the lamp device (hereinafter, referred to as a 'lamp axis'), which makes it possible to prevent ultraviolet rays or infrared rays (so-called reflected light) reflected from the filter from being incident on the light emitting portion of the lamp body again. In this way, it is possible to prevent an increase in the temperature of the lamp body due to the reflected light and thus prevent the lamp body from being deteriorated. As a result, it is possible to prolong the life span of the lamp device. In particular, when the filter reflects infrared rays, which are heat rays, it is possible to effectively prevent an increase in the temperature of the lamp device. In addition, since the planar surface of the lens member is also used as a filter supporting member, an increase in the size of the illuminating device due to the filter does not occur. Since the normal line of the planar surface having the filter formed thereon is slightly inclined with respect to the lamp axis, it is possible to filter whole light beams without increasing the area of the filter. Therefore, according to the illuminating device of the invention, it is possible to effectively block infrared rays or ultraviolet rays using a filter having a small area, without increasing the size of an illuminating device.

The term 'substantially parallel to the optical axis of the lamp device (lamp axis)' includes 'completely parallel to the lamp axis' and 'slightly nonparallel to the lamp axis'. The term 'completely parallel to the lamp axis' means that light is completely parallel to the lamp axis in theory. The term 'slightly nonparallel to the lamp axis' means that, when the normal line of the planar surface of the lens member is aligned with the lamp axis, light should be completely parallel to the lamp axis in theory; however, when the normal line of the lens member is slightly inclined at a predetermined angle with respect to the lamp axis, the light is not completely parallel to the lamp axis.

In the illuminating device according to the above-mentioned aspect, preferably, the concave reflector is an ellipsoidal reflector that reflects the light emitted from the lamp body to converge, and the lens member is a lens that collimates the light reflected from the ellipsoidal reflector. In addition, preferably, the nonplanar optical surface of the lens member is a concave surface, and the concave surface is arranged closer to the ellipsoidal reflector than the planar optical surface. That is, the lens member is a plano-concave lens, and a concave surface of the lens member is arranged closer to the lamp device including the ellipsoidal reflector. Light emitted from the lamp body is reflected from the ellipsoidal reflector to converge, and is then converted into substantially parallel light by the concave surface of the lens member (when the concave surface is a spherical surface and the axis of the spherical surface is inclined with respect to the optical axis of the lamp device, the light is not completely parallel to the lamp axis in theory). Then, the parallel light is incident on the planar surface having the filter formed thereon. Therefore, in this case, it is possible to converge light beams emitted from the lamp body by using the ellipsoidal reflector and obtain parallel light required to illuminate by using the plano-concave lens for collimating light. In addition, it is possible to effectively block infrared rays or ultraviolet rays with a filter having a small area by arranging the concave surface of the plano-concave lens closer to the ellipsoidal reflector.

In the illuminating device according to the above-mentioned aspect, preferably, the concave reflector is a paraboloidal reflector that reflects the light emitted from the lamp body to travel as parallel light, and the lens member is a lens that condenses the parallel light reflected from the paraboloidal reflector. In addition, preferably, the nonplanar optical surface of the lens member is a convex surface, and the planar optical surface is arranged closer to the paraboloidal reflector than the convex optical surface. That is, the lens member is a plano-convex lens, and the planar surface of the plano-convex lens is arranged so as to face the lamp device including the paraboloidal reflector. Parallel light emitted from the lamp device is directly incident on the planar surface having a filter formed thereon. In this case, the paraboloidal surface can directly convert light emitted from the lamp body into parallel light, and desired illumination light can be obtained by the plano-convex lens. In addition, it is possible to effectively block infrared rays or ultraviolet rays with a filter having a small area by arranging the planar surface of the plano-convex lens so as to face the paraboloidal reflector.

In the illuminating device according to the above-mentioned aspect, preferably, the concave reflector is a paraboloidal reflector that reflects the light emitted from the lamp body to travel as parallel light, and a plano-convex lens that condenses the parallel light reflected from the paraboloidal reflector is provided on an emission side of the concave reflector. In addition, preferably, the lens member is a lens that collimates the light condensed by the plano-convex lens, and is arranged on an emission side of the plano-convex lens. Further, preferably, the nonplanar optical surface of the lens member is a concave surface, and the concave surface is arranged closer to the piano-convex lens than the planar optical surface. That is, the lens member is a plano-concave lens, and a concave surface of the lens member is arranged so as to face the plano-convex lens for converging parallel light emitted from the lamp device. The parallel Light emitted from the lamp device converges by the plano-convex lens, and is then converted into light substantially parallel to the optical axis of the lamp device by the concave surface of the lens member (when the concave surface is a spherical surface and the axis of the spherical surface is inclined with respect to the optical axis of the lamp device, the light is not completely parallel to the lamp axis in theory). Then, the parallel light is incident on the planar surface having the filter formed thereon. Therefore, in this case, it is possible to reduce the width of parallel light emitted from the lamp device including the paraboloidal reflector by using the plano-convex lens and the plano-concave lens. In addition, it is possible to effectively block infrared rays or ultraviolet rays with a filter having a small area by arranging the concave surface of the plano-concave lens so as to face the piano-convex lens.

In the illuminating device according to the above-mentioned aspect, preferably, the predetermined angle is in a range of 1° to 13°. The predetermined angle needs to be equal to or larger than 1° in order to reliably prevent an increase in the temperature of the lamp body due to reflected light. When the angle is larger than 13°, the area of the filter increases, but the amount of reduction in the temperature of the lamp body is substantially equal to that when the angle is equal to 13°. When the angle is 13° or less, the tilt angle of the lens member can be reduced to the extent that optical characteristics are not affected.

In the above-mentioned aspect, preferably, the illuminating device further includes a housing that holds the lamp device and the lens member and shields a space between the lamp device and the lens member from the outside. In this case, the housing can protect the lamp device and the lens member, and the housing makes it easy to manage heat generated from the lamp device.

According to another aspect of the invention, a projector includes: the illuminating device according to the above-mentioned aspect; a light modulating device that modulates illumination light emitted from the illuminating device to form an optical image; and a projection optical system that projects the optical image formed by the light modulating device.

According to the illuminating device of the above-described aspect, it is possible to prevent a device to be illuminated by the illuminating device or optical elements on an illumination optical path from being chemically damaged due to ultraviolet rays or infrared rays, and thus to prevent defects in the device to be illuminated or the optical elements. That is, it is possible to effectively cut off ultraviolet rays or infrared rays from illumination light and thus to improve the durability of a projector and prolong the life span of the projector. As a result, it is possible to prevent the frequent replacement of a lamp device. Further, in the illuminating device according to the above-mentioned aspect, the filter does not cause an increase in the size of the illuminating device, and it is unnecessary to increase the area of the filter. Therefore, it is possible to prevent a remarkable increase in the size of a projector and the manufacturing costs thereof due to the filter.

BRIEF DESCRIPTION OF THE DRAWINGS

The invention will be described with reference to the accompanying drawings, wherein like numbers refer like elements.

FIG. 2A is a cross-sectional view illustrating a light source lamp unit provided in the projector shown in FIG. 1.

FIG. 2B is a diagram illustrating a concave lens 23 that has a normal line H of a planar surface 23b inclined at a very small angle of α with respect to a lamp axis OA.

DESCRIPTION OF EXEMPLARY EMBODIMENTS

First Embodiment

Figure 1:
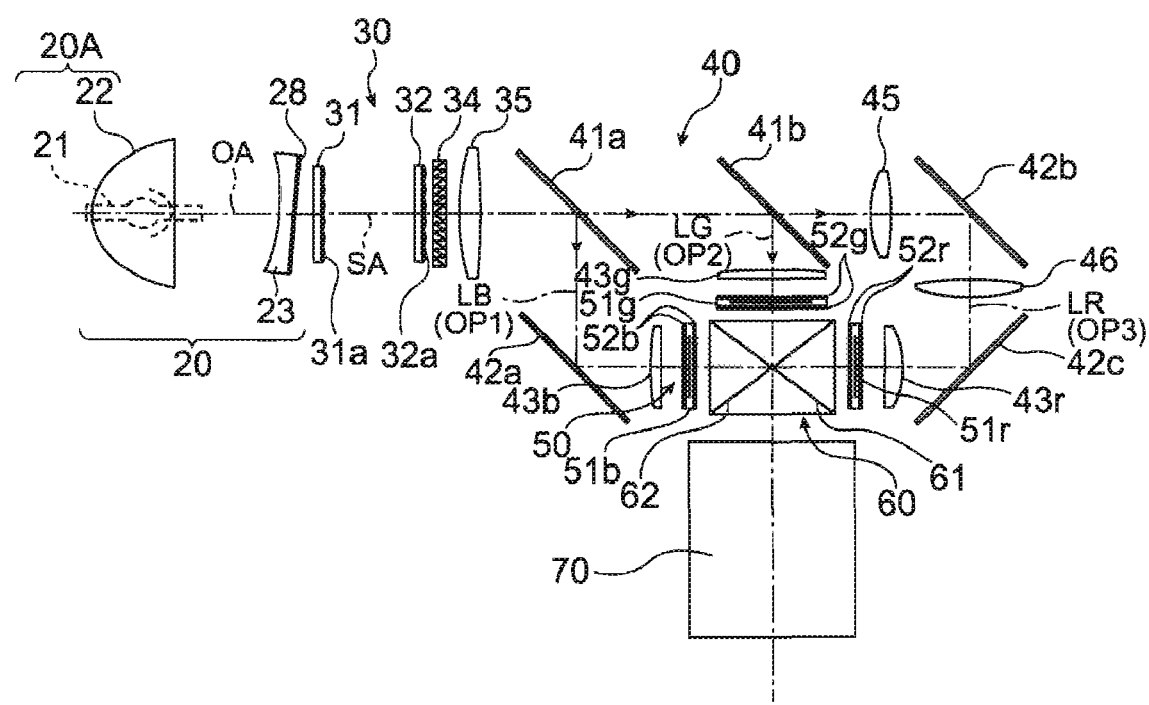
FIG. 1 is a diagram illustrating an optical system of a projector according to a first embodiment of the invention.

FIG. 1 is a block diagram illustrating the structure of an optical system of a projector according to a first embodiment of the invention.

A projector 10 is an optical apparatus for modulating a light beam emitted from a light source on the basis of image information to form an optical image and for enlarging and projecting the optical image onto a screen. The projector 10 includes a light source lamp unit 20, an illumination optical system 30, a color separating device 40, a light modulating unit 50, a dichroic cross prism 60, and a projection optical system 70. The light source lamp unit 20 and the illumination optical system 30 constitute an illustrating device for emitting an illustration light for illuminating the light modulating device 50.

The light source lamp unit 20 condenses light beams radially emitted from a lamp body 21 to be incident on the light modulating unit 50 through the illumination optical system 30 and the color separating device 40. The light source lamp unit 20 includes a lamp device 20A including the lamp body 21, which is a light-emitting tube for emitting light by means of discharge, and a main reflecting mirror 22, which is an elliptical concave reflector for reflecting light beams emitted from the lamp body 21, and a concave lens 23 that is provided on the emission side of the lamp device 20A. In the light source lamp unit 20, light beams emitted from the lamp body 21 are collimated by the main reflecting mirror 22 and the concave lens 23, and the collimated light beams travel toward the front side, that is, the illumination optical system 30. A normal line H of the concave lens 23 is slightly inclined with respect to an optical axis (lamp axis) OA of the light source lamp (see FIG. 2B), which will be described later.

The illumination optical system 30 is a uniformizing optical system for dividing a light beam emitted from the light source lamp unit 20 into a plurality of partial light beams, and superposing the plurality of partial light beams on an illuminated region to uniformize illuminance of the illuminated region. In this embodiment, the illuminated region corresponds to image forming regions of liquid crystal display panels 51b, 51g, and 51r, which will be described later. The illustration optical system 30 includes a first lens array 31, a second lens array 32, a polarizing member 34, and a condenser lens 35.

The first lens array 31 is an optical element for dividing the light beam emitted from the light source lamp unit 20 into a plurality of partial light beams, and includes a plurality of small lenses 31a that are arranged in a matrix on the plane orthogonal to a system optical axis SA. Each of the small lenses 31a are formed such that its shape is substantially similar to the shapes of the image forming regions of the liquid crystal display panels 51b, 51g, and 51r. The second lens array 32 is an optical element for condensing the plurality of partial light beams divided by the first lens array 31, and includes a plurality of small lenses 32a that are arranged in a matrix on the plane orthogonal to the system optical axis SA, like the first lens array 31. Since the small lenses 32a are provided to condense light beams, the shapes of the small lenses 32a do not need to correspond to the shapes of the image forming regions of the liquid crystal display panels 51b, 51g, and 51r.

The polarizing member 34 is composed of a PBS array and a retardation plate, and linearly polarizes the partial light beams divided by the first lens array 31 in a predetermined direction. Although not shown in detail in the drawings, the PBS array of the polarizing member 34 includes polarizing films inclined at an angle of 45° with reflect to the system optical axis SA and reflecting mirrors, and the polarizing films and the reflecting mirrors are alternately arranged. The polarizing film transmits one of a P polarized light beam and an S polarized light beam included in the partial light beams and reflects the other polarized light beam. The reflected polarized light beam is refracted by the reflecting mirror to travel in a direction in which the transmitted polarized light beam travels, that is, along the system optical axis SA. The light beams having passed through the polarizing film and reflected from the reflecting mirror are polarized in the same direction by a retardation plate provided in a stripe shape on the emission surface of the polarizing member 34. The use of the polarizing member 34 makes enables the light beams emitted from the lamp body 21 to be polarized in the same direction, which makes it possible to improve the usage efficiency of light used for the light modulating unit 50.

The condenser lens 35 is a superposing optical element that condenses the plurality of partial light beams sequentially passing through the first lens array 31, the second lens array 32, and the polarizing member 34 to be incident on the image forming regions of the liquid crystal display panels 51b, 51g, and 51r so as to be superposed thereon. The light beam emitted from the condenser lens 35 is uniformized and is then incident on the color separating device 40 in the next stage. That is, illumination light beams having passed through the first and second lens arrays 31 and 32 and the condenser lens 35 are incident on the light modulating unit 50, that is, the image forming regions of the liquid crystal display panels 51b, 51g, and 51r through the color separating device 40, which will be described below.

The color separating device 40 includes first and second dichroic mirrors 41a and 41b, reflecting mirrors 42a, 42b, and 42c, field lenses 43b, 43g, and 43r, and relay optical systems 45 and 46. A color separating optical system composed of the first and second dichroic mirrors 41a and 41b separates illumination light into three light beams, that is, blue (B), green (G), and red (R) light beams. Each of the first and second dichroic mirrors 41a and 41b is an optical element obtained by forming on a transparent substrate a dielectric multi-layer film having a wavelength selecting function of reflecting light beams in a predetermined wavelength range and transmitting light beams in a wavelength range other than the predetermined wavelength range. Each of the first and second dichroic mirrors 41a and 41b is inclined at an angle of 45° with respect to the system optical axis SA. The first dichroic mirror 41a reflects a blue light beam LB among the red, green, and blue (R, G, and B) light beams and transmits a green light beam LG and a red light beam LR. The second dichroic mirror 41b reflects the green light beam LG of the incident green and red light beams LG and LR, and transmits the red light beam LR.

The illumination light emitted from the light source lamp unit 20 passes through the illumination optical system 30 and is then incident on the first dichroic mirror 41a of the color separating unit 40. The blue light beam LB reflected from the first dichroic mirror 41a is guided to a first optical path OP1 and is then reflected from the reflecting mirror 42a to be incident on the field lens 43b in the final stage. In addition, the green light beam LG having passed through the first dichroic mirror 41a is reflected from the second dichroic mirror 41b to be guided to a second optical path OP2 and is then incident on the field lens 43g in the final stage. The red light beam LR having passed through the second dichroic mirror 41b is guided to a third optical path OP3 and is then incident on the field lens 43r in the final stage via the reflecting mirrors 42b and 42c and the relay optical systems 45 and 46. The relay optical systems 45 and 46 transmit an image formed immediately before the first lens 45 on the incident side to the field lens 43r on the emission side through the second lens 46 provided in the next stage of the first lens 45, thereby preventing the usage efficiency of light from being lowered due to, for example, the diffusion of light.

The light modulating unit 50 includes three liquid crystal display panels 51b, 51g, and 51r on which the three illumination beams LB, LG, and LR are incident, respectively, and three pairs of polarizing filters 52b, 52g, and 52r each provided at both sides of the corresponding liquid crystal display panel 51*b*, 51*g*, and 51*r*. For example, the liquid crystal display panel 51*b* for the blue light beam LB and a pair of polarizing filters 52*b*, 52*b* provided at both sides of the liquid crystal display panel 51*b* form a liquid crystal light valve for two-dimensionally modulating the brightness of illumination light. Similarly, the liquid crystal display panel 51*g* for the green light beam LG and the corresponding polarizing filters 52*g*, 52*g* provided at both sides of the liquid crystal display panel 51*g* form a liquid crystal light valve, and the liquid crystal display panel 51*r* for the red light beam LR and the corresponding polarizing filters 52*r*, 52*r* provided at both sides of the liquid crystal display panel 51*r* form a liquid crystal light valve. Each of the liquid crystal display panels 51*b*, 51*g*, and 51*r* has a pair of transparent glass substrates and liquid crystal, which is an electro-optical material, injected between the pair of substrates, and modulates the polarizing direction of the polarized light beam incident thereon on the basis of input image signals by using polysilicon TFTs as switching elements.

In the light modulating unit 50, the blue light beam LB guided to the first optical path OP1 is incident on the image forming region of the liquid crystal display panel 51*b* through the field lens 43*b*. The green light beam LG guided to the second optical path OP2 is incident on the image forming region of the liquid crystal display panel 51*g* through the field lens 43*g*. The red light beam LR guided to the third optical path OP3 is incident on the image forming region of the liquid crystal display panel 51*r* through the relay optical systems 45 and 46 and the field lens 43*r*. The liquid crystal display panels 51*b*, 51*g*, and 51*r* are transmissive light modulating devices for changing the spatial distribution of the incident illumination beams in the polarizing direction thereof. The polarizing states of the blue, green, and red light beams LB, LG, and LR respectively incident on each pixel of the liquid crystal display panels 51*b*, 51*g*, and 51*r* are adjusted in response to control signals or driving signals input to the liquid crystal display panels 51*b*, 51*g*, and 51*r* as electric signals according to image information. In this case, the polarizing directions of the light beams incident on the liquid crystal display panels 51*b*, 51*g*, and 51*r* are adjusted by the polarizing filters 52*b*, 52*g*, and 52*r*, so that light beams polarized in a predetermined directions are emitted from the liquid crystal display panels 51*b*, 51*g*, and 51*r*.

The cross dichroic prism 60 is a light combining optical system that combines optical images formed by light beams emitted from the polarizing plates which are provided on the emission sides to form a color image. The cross dichroic prism 60 includes a member having a substantially square shape in plan view that is composed of four right-angled prisms bonded to one another, and a pair of dielectric multi-layer films 61 and 62 provided at the boundaries among the right-angled prisms in an X shape. The first dielectric multi-layer film 61 reflects the blue light beams and the second dielectric multi-layer film 62 reflects the red light beam. The blue light beam LB emitted from the liquid crystal display panel 51*b* is reflected from the first dielectric multi-layer film 61 of the cross dichroic prism 60 to the right at a right angle, and the red light beam LR emitted from the liquid crystal display panel 51*r* is reflected from the second dielectric multi-layer film 62 of the cross dichroic prism 60 to the left at a right angle. In addition, the green light beam LG emitted from the liquid crystal display panel 51*g* passes through both the first and second dielectric multi-layer films 61 and 62 of the cross dichroic prism 60 and then travels straight.

The image combined by the cross dichroic prism 60 is enlarged at a predetermined enlargement ratio by the projection optical system 70, serving as an enlarging/projecting lens, and is then projected onto a screen (not shown) as a color image.

Figure 3:
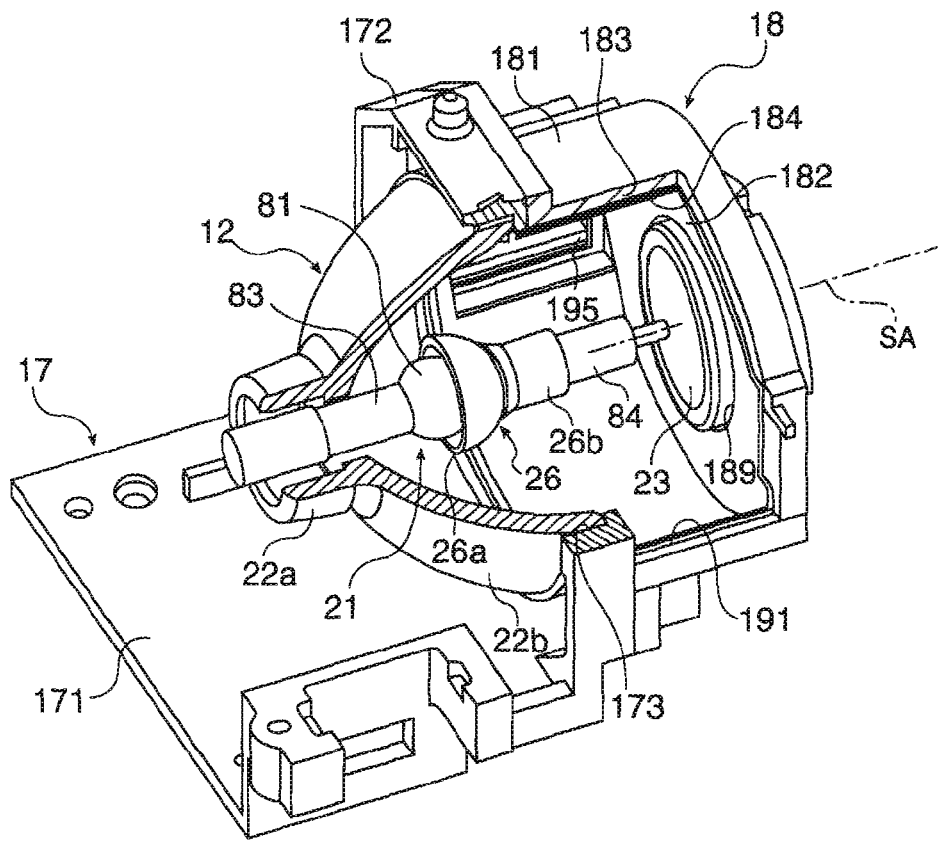
FIG. 3 is a perspective view illustrating the light source lamp unit provided in the projector shown in FIG. 1.

FIG. 2A is a side cross-sectional view illustrating the light source lamp unit 20 provided in the projector 10 shown in FIG. 1, and FIG. 3 is a perspective view of the light source lamp unit 20.

The light source lamp unit 20 includes the lamp device 20A having the lamp body 21 and the main reflecting mirror 22, and the concave lens 23, which are described above, and a sub-reflecting mirror 26 supported by the lamp body 21, a lamp holder 17 for holding the main reflecting mirror 22, and a holding member 18 for holding the concave lens 23. The holding member 18 and the lamp holder 17 serve as a housing for shielding a space between the main reflecting mirror 22 and the concave lens 23 from the outside.

The lamp body 21 is formed of a quartz glass tube having a central part protruding in a circular shape. The central part serves as a light emitting portion 81, and first and second sealing portions 83 and 84 extend from both ends of the light emitting portion 81. A discharge lamp, such as a metal halide lamp, a high-pressure mercury lamp, or an extra-high pressure mercury lamp, is used as the lamp body 21.

A pair of electrodes 85 and 86 provided at a predetermined distance from each other and a discharge gas are sealed in the light emitting portion 81. The electrodes 85 and 86 provided in the light emitting portion 81 and metal films 87*a* and 87*b* electrically connected to the electrodes 85 and 86 are inserted into the sealing portions 83 and 84, respectively, and the leading ends of the sealing portions 83 and 84 are sealed. When a voltage is applied to lead wires 88*a* and 88*b* connected to the metal films 87*a* and 87*b*, an arch discharge occurs between the pair of electrodes 85 and 86, and the light emitting portion 81 emits light with high brightness.

Almost the front half of the light emitting portion 81 of the lamp body 21 on the emission side is covered with the sub-reflecting mirror 26. The sub-reflecting mirror 26 includes a sub-reflecting portion 26*a* for reflecting light emitted forward from the light emitting portion 81 of the lamp body 21 to the light emitting portion 81 and a supporting unit 26*b* that is fixed around the second sealing portion 84 while supporting the root of the sub-reflecting portion 26*a*. The inner glass surface of the sub-reflecting portion 26*a* is formed in a substantially concave spherical shape according to the surface of the light emitting portion 81, and a reflective surface 26*c* formed of, for example, a dielectric multi-layer film is formed on the spherical surface. The second sealing unit 84 of the lamp body 21 is inserted to the supporting portion 26*b*. An inorganic adhesive is filled in a gap between the supporting portion 26*b* and the second sealing portion 84 of the lamp body 21, thereby fixing the sub-reflecting mirror 26 to the lamp body 21. In this case, the sub-reflecting mirror 26 is fixed to the lamp body 21 such that the sub-reflecting portion 26*a* is aligned with the light emitting portion 81.

The main reflecting mirror 22 is a single-piece member made of quartz glass that includes a head portion 22*a* to which the first sealing portion 83 of the lamp body 21 is inserted and a main reflecting portion 22*b* that has a semi-ellipsoidal surface widened from the head portion 22*a*. The first sealing portion 83 of the lamp body 21 is inserted to the head portion 22*a*. An inorganic adhesive is filled in a gap between the first sealing portion 83 and the head portion 22*a* of the main reflecting mirror 22, thereby fixing the lamp body 21 to the main reflecting mirror 22. In this case, the lamp body 21 is fixed to the main reflecting mirror 22 such that the main reflecting portion 22*b* is aligned with the light emitting portion 81. The inner glass surface of the main reflecting portion 22b is formed in a substantially ellipsoidal shape, and a reflective surface 22c formed of, for example, a dielectric multi-layer film that transmits infrared rays is formed on the ellipsoidal surface. In this way, an infrared ray emitted from the lamp body 21 to the main reflecting mirror 22 passes through the base of the main reflecting mirror 22 to be emitted to the outside of the light source lamp unit 20. As a result, heat is dissipated from the rear surface of the main reflecting mirror 22, which makes it possible to protect the lamp body 21 from infrared rays. In addition, the infrared ray having passed through the main reflecting mirror 22 is shielded by a case (not shown) for optical parts that covers the light source lamp unit 20, which causes no infrared ray to leak to the outside.

The lamp body 21 is arranged along the lamp axis OA of the main reflecting portion 22b, and the luminescent center O between the electrodes 85 and 86 of the light emitting portion 81 is substantially matched with the position of a first focus F1 of the ellipsoidal surface of the main reflecting portion 22b. When the lamp body 21 is turned on, a light beam emitted from the light emitting portion 81 is reflected from the main reflecting portion 22b, or it is sequentially reflected from the sub-reflecting portion 26a and the main reflecting portion 22b and then converges to a second focus F2 of the ellipsoidal surface. Since the concave lens 23 is arranged between the main reflecting mirror 22 and the second focus F2, the light beams reflected from the main reflecting mirror 22 to converge are collimated by the concave lens 23. That is, light beams emitted from the light source lamp unit 20 are collimated.

The concave lens 23 is provided on the emission side of the main reflecting mirror 22, that is, the emission side of the lamp device 20A. The concave lens 73 is provided to collimate the light beams reflected from the main reflecting mirror 22, and includes a planar surface 23b, which is a planar optical surface, and a concave surface 23a, which is a non-planar optical surface opposite to the planar optical surface. The concave surface 23a is arranged closer to the main reflecting mirror 22 than the planar surface 23b. A filter 28 for filtering ultraviolet rays is formed on the planar surface 23b. The filter 28 is formed of a dielectric multi-layer film, and reflects ultraviolet rays while transmitting light beams other than the ultraviolet rays. This embodiment is characterized by the arrangement of the concave lens 23, which will be described in detail later.

In FIG. 3, the lamp holder 17 is a member having an L shape in sectional view, and includes a horizontal portion 171 and a vertical portion 172. The horizontal portion 171 can be fixed to the wall of the case (not shown) for optical parts of the projector 10, and enables the light source lamp unit 20 to be fixed to an appropriate position of the case for optical parts. The vertical portion 172 is provided to define the attachment position of the main reflecting mirror 22. That is, an outer circumferential edge of an emission-side opening of the main reflecting mirror 22 is fixed to an opening portion 173 of the vertical portion 172 by, for example, mechanical pressure or an adhesive.

The holding member 18 has a cylindrical shape corresponding to the emission-side opening of the main reflecting mirror 22, and is adhesively fixed to the vertical portion 172 from the side opposite to the main reflecting mirror 22, thereby holding the outer circumferential edge of the concave lens 23. The holding member 18 has a dual structure of a holding member body 183 provided outward and an absorption member 184 provided on the inner surface of the holding member body 183. The holding member body 183 provided outward includes a cylindrical portion 181 and a holding portion 182 integrated with the cylindrical portion 181. The cylindrical portion 181 encloses the lamp body 21. A rectangular air inlet 191 is formed in the surface of the cylindrical portion 181 of the holding member body 183, and a rectangular air outlet 195 is formed in the surface of the cylindrical portion 181 at a position opposite to the air inlet 191. In this way, it is possible to ensure a cooling air path passing through a space between the holding member 18 and the main reflecting mirror 22. The holding portion 182 is provided to close up the emission side of the cylindrical portion 181, and has an opening 189 to which the concave lens 23 is obliquely fitted.

The absorption member 184 may be formed of various materials capable of absorbing light and having low reflectance to prevent light emitted from the lamp body 21 from being incident on the holding member body 183.

This embodiment is characterized in that the optical axis of the concave lens 23 (which is aligned with a normal line H of the planar surface 23b) is slightly inclined with respect to the lamp axis OA. That is, as shown in FIG. 2B, the concave lens 23 is arranged such that the normal line H of the planar surface 23b is slightly inclined at an angle of α° with respect to the lamp axis OA. The planar surface 23b slightly inclined at an angle of α° with respect to the lamp axis OA makes it possible to prevent ultraviolet rays reflected from the filter 28 to the lamp device 21 from being incident on the light emitting portion 81 of the lamp body 21 again. This is because the ultraviolet ray is reflected from the filter 28 that is provided on the planar surface 23b in a direction different from the direction in which the ultraviolet lay is incident on the filter 28 and then returns to the lamp body 21 in an optical path different from that of the incident light. This structure can reduce probability that the light (reflected light) returning to the lamp body 21 in an optical path different from that of incident light will be incident on the light emitting portion 81 again, as compared to the structure in which the normal line of the planar surface 23b is aligned with the lamp axis OA. Therefore, it is possible to prevent the reflected light from being incident on the light emitting portion 81 of the lamp body 21 and thus prevent an increase in the temperature of the lamp body 21. As a result, it is possible to prevent the deterioration of the lamp body 21 and thus prolong the life span of the lamp device 20A. Thus, it is unnecessary to frequently replace the light source lamp unit 20 with new one.

Next, as shown in FIG. 2A, the concave surface 23a of the lens member 23 is arranged closer to the main reflecting mirror 22 than the planar surface 23b. As a result, light beams substantially parallel to the lamp axis OA (light beams slightly deviating from the lamp axis OA) are incident on the planar surface 23b, and thus the filtering efficiency of the filter is not lowered. In this embodiment, since the concave portion 23a is a spherical surface and the axis of the spherical surface (which is aligned with the optical axis of the concave lens 23, that is, the normal line H of the planar surface 23b) is inclined with respect to the lamp axis OA, a light beam incident on the planar surface 23b is not completely parallel to the lamp axis OA in theory. Therefore, when the normal line H of the planar surface 23b is completely parallel to the lamp axis OA, a light beam incident on the planar surface 23b is completely parallel to the lamp axis OA in theory. However, when the normal line H of the planar surface 23b is inclined at a predetermined angle with respect to the lamp axis OA, the normal line H just slightly deviates from the lamp axis. The deviation between the normal line and the lamp axis is not large enough to affecting the performance of the filter 28. Therefore, it is possible to prevent the liquid crystal display panels 51b, 51g, and 51r to be illuminated or optical elements on an illumination optical path (for example, polarizing filters 52b, 52g, and 52r) from being chemically damaged due to ultraviolet rays, and thus to prevent defects in the devices to be illuminated or the optical elements. Thus, it is possible to improve the durability of a projector and to prolong the life span of the projector.

Further, in this embodiment, since the planar surface 23b of the lens member 23 is used as a supporting member of the filter 28, the filter 28 makes it possible to prevent an increase in the size of the lamp device 20A or an illuminating device formed by combining the lamp device 20A with the illumination optical system 30. Since the normal line H of the planar surface 23b having the filter 28 provided thereon is slightly inclined with respect to the lamp axis OA, it is possible to cover a wide range of light beams without excessively increasing the area of the filter 28. Therefore, the filter 28 makes it possible to prevent an increase in the size of a projector and a remarkable increase in the manufacturing costs of a projector.

Figure 4:
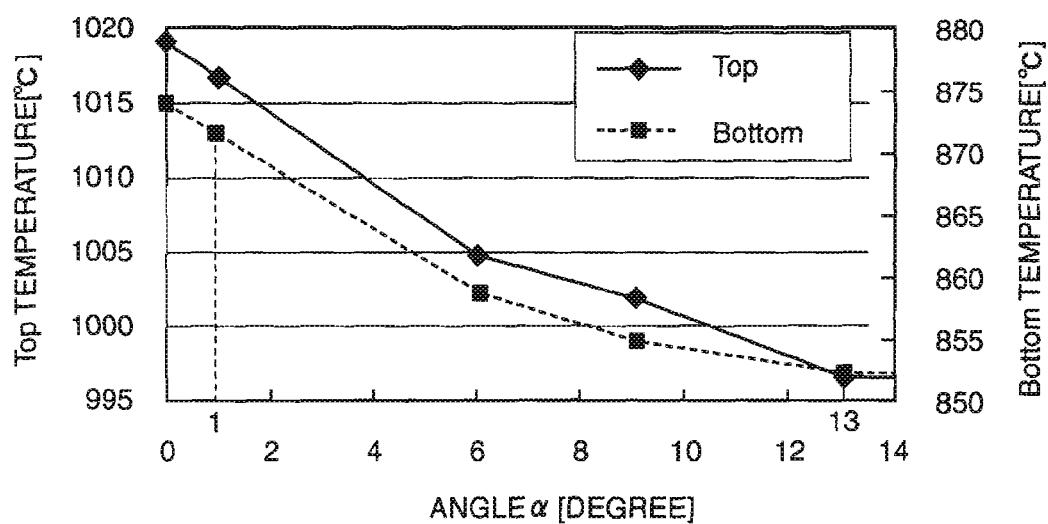
FIG. 4 is a graph illustrating the relationship between the angle α and reduction in the temperature of a light emitting portion 81 of a lamp body 21.

In this structure, it is preferable that the angle α be in the range of 1° to 13°. FIG. 4 is a graph illustrating the relationship the angle α and a reduction in the temperature of the light emitting portion 81 of the lamp body 21. In the graph shown in FIG. 4, a horizontal axis indicates the angle α between the planar surface 23b, that is, the filter 28 and the lamp axis OA, and a vertical axis indicates the maximum temperature (a solid line linking symbols ♦) and the minimum temperature (a dotted line linking symbols ■) of the light emitting portion 81 of the lamp body 21. As can be seen from the graph, the temperature of the lamp body 21 gradually decreases as the angle α becomes larger. Therefore, it is necessary that the angle between the normal line of the planar surface and the lamp axis be equal to or larger than 1° in order to reliably reduce the temperature of the lamp body 21. When the angle α is larger than 13°, the degree of reduction in the temperature of the lamp body 21 due to reflected light is substantially the same as that when the angle α is equal to 13°. When the angle α is larger than 13°, the amount of reduction in the temperature of the lamp body 21 is substantially equal to that when the angle α is equal to 13°. When the angle α is larger than 13°, the area of the filter 28 is just increased. Therefore, it is preferable that the angle α be equal to or smaller than 13°. In addition, when the angle α is equal to or smaller than 13°, it is possible to reduce the inclination of the lens member 23 to the extent that the optical performance thereof is not affected.

When the normal line H of the concave lens 23 is inclined with respect to the lamp axis OA, substantially parallel light beams are emitted from the planar surface 23b of the concave lens 23, but a shift in the optical axis of the light beam occurs between before and after the light beam passes through the concave lens 23. That is, the lamp axis OA formed by the main reflecting mirror 22 is substantially parallel to the optical axis OA2 formed by a combination of the main reflecting mirror 22 and the concave lens 23, so that positional deviation occurs between the lamp axis OA and the optical axis OA2 due the angle α. However, the shift in the optical axis is very small enough to neglect. Even when the amount of shift in the optical axis is not very small enough to neglect, it is possible to easily compensate for the shift in the optical axis by adjusting the positions of optical elements provided after the light source lamp unit 20, for example, the lens arrays 31 and 31 and the condenser lens 35.

Second Embodiment

Figure 5:
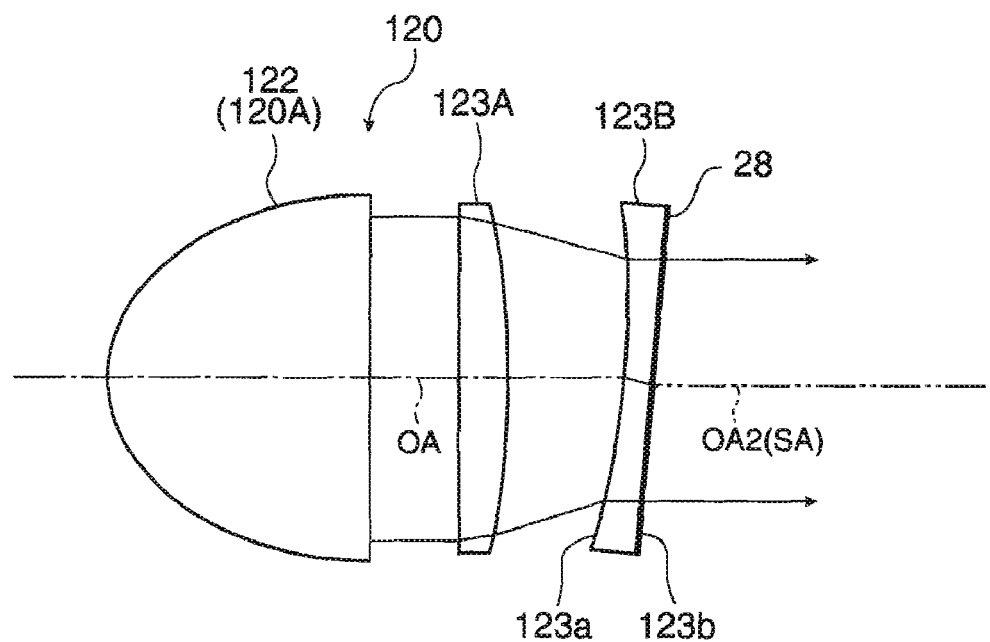
FIG. 5 is a diagram illustrating an optical system of the main part of a projector according to a second embodiment of the invention.

FIG. 5 is a side view illustrating a light source lamp unit 120 of an illuminating device according to a second embodiment of the invention. The light source lamp unit 120 is used for the projector 10 according to the first embodiment shown in FIG. 1 instead of the light source lamp unit 20. In the light source lamp unit, components not particularly described in this embodiment have the same structure as those in the light source lamp unit 20 according to the first embodiment. In addition, in this embodiment, the same components as those in the first embodiment have the same reference numerals, and thus a description thereof will be omitted.

In the light source lamp unit 120 according to the second embodiment, a main reflecting mirror 122 has a paraboloid, not an ellipsoid. The main reflecting mirror 122 reflects light emitted from a lamp body (not shown) as parallel light. A plano-convex lens 123A and a plano-concave lens 123B are arranged in this order on the emission side of the main reflecting mirror 122, that is, the emission side of a lamp device 120A having the main reflecting mirror 122 and the lamp body. The plano-convex lens 123A is a lens for condensing the parallel light emitted from the main reflecting mirror 122. The plano-convex lens 123A is arranged orthogonal to the lamp axis OA. That is, the optical axis of the piano-convex lens 123A is aligned with the lamp axis OA. Meanwhile, the plano-concave lens 123B is a lens for collimating the light condensed by the plano-convex lens 123A. The plano-concave lens 123B includes a concave surface 123a, which is a nonplanar optical surface, and a planar surface 123b, which is a planar optical surface. The plano-concave lens 123B is arranged such that a normal line H of the planar surface 123b is inclined at a very small angle of α (α is preferably in the range of 1° to 13°) with respect to the lamp axis OA. The concave surface 123a of the plano-concave lens 123B is arranged closer to the plano-convex lens 123A than the planar surface 123b. A filter 28 that reflects ultraviolet rays but transmits light beams other than the ultraviolet rays as light source beams is formed on the planar surface 123b.

When the light source lamp unit 120 according to this embodiment is used for an illuminating device or a projector, it is possible to obtain the same effects as those in the first embodiment.

Third Embodiment

Figure 6:
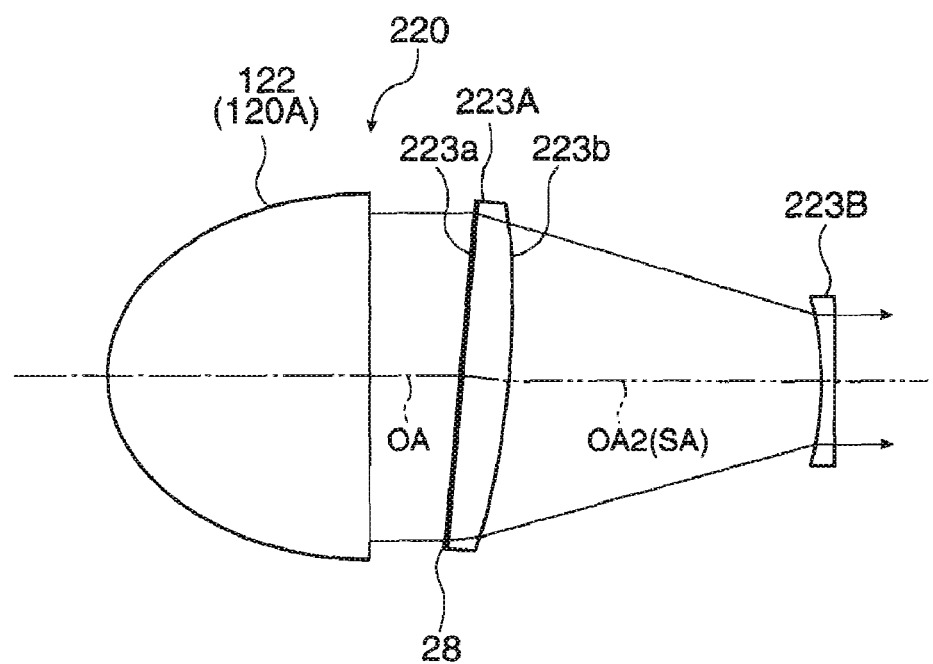
FIG. 6 is a diagram illustrating an optical system of the main part of a projector according to a third embodiment of the invention.

In the second embodiment, the plano-convex lens 123A is provided orthogonal to the lamp axis OA, but the plano-concave lens 123B is inclined at a very small angle with respect to the lamp axis OA. However, the filter 28 may be formed on the planar surface of the plano-convex lens 123A, and the plano-convex lens 123A may be provided such that the normal line of the planar surface is inclined with respect to the lamp axis OA. In this embodiment, the above-mentioned structure will be described. FIG. 6 is a side view illustrating a light source lamp unit 220 of an illuminating device according to a third embodiment of the invention. In the light source lamp unit 220, components not particularly described in this embodiment have the same structure as those in the light source lamp unit 120 according to the second embodiment.

In the light source lamp unit 220 according to the third embodiment, a plano-convex lens 223A and a plano-concave lens 223B are arranged in this order on the emission side of the main reflecting mirror 122, that is, the emission side of a lamp device 120A having the main reflecting mirror 122 and a lamp body (not shown). The plano-convex lens 223A and the plano-concave lens 223B have the same functions as the piano-convex lens 123A and the plano-concave lens 123B in the second embodiment. The plano-convex lens 223A includes a planar surface 223a, which is a planar optical surface, and a convex surface 223b, which is a nonplanar optical surface. The plano-convex lens 223A is arranged such that a normal line H of the planar surface 223a is inclined at a very small angle (the angle is preferably in the range of 1° to 13°) with respect to the lamp axis OA. The planar surface 223a of the plano-convex lens 223A is arranged closer to the main reflecting mirror 112 than the convex surface 223b. A filter 28 that reflects ultraviolet rays, but transmits light beams other than the ultraviolet rays as light source beams is formed on the planar surface 223a. Meanwhile, the plano-concave lens 223B is arranged orthogonal to an optical axis OA2 formed by a combination of the main reflecting mirror 122 and the plano-convex lens 223A. That is, the optical axis of the plano-concave lens 223B is aligned with the optical axis OA2.

When the light source lamp unit 220 according to this embodiment is used for an illuminating device or a projector, it is possible to obtain the same effects as those in the first embodiment.

The invention is not limited to the above-described embodiments, but various modifications and changes of the invention can be made without departing from the scope and spirit of the invention. For example, the following modifications of the invention can be made.

In the above-described embodiments, the reflective surface formed on the main reflecting mirror 22 or 122 transmits infrared rays to eliminate the infrared rays and the filter 28 reflects ultraviolet rays to eliminate the ultraviolet rays. However, the invention is not limited thereto. For example, the reflective surface formed on the main reflecting mirror 22 or 122 may be configured to transmit ultraviolet rays to eliminate the ultraviolet rays or transmit both ultraviolet rays and infrared rays to eliminate both the ultraviolet and the infrared rays. In addition, the filter 28 may be configured to reflect infrared rays to eliminate the infrared rays or reflect both ultraviolet rays and infrared rays to both the ultraviolet rays and the infrared rays. In particular, when the filter 28 reflects infrared rays, which are heat rays, an increase in the temperature of the lamp is remarkably prevented. The type of light beams passing through the reflective surface of the main reflecting mirror 22 or 122 may be the same as the type of light reflected by the filter 28. When The type of light beams passing through the reflective surface of the main reflecting mirror 22 or 122 is the same as the type of light reflected by the filter 28, even if the reflective surface formed on the main reflecting mirror 22 or 122 cannot transmit all of infrared rays or ultraviolet rays, the filter 28 may reflect the infrared rays and the ultraviolet rays.

In the above-described embodiments, the lamp device 20A is integrated with the lens member 23 to form the lamp unit 20, the lamp device 120A is integrated with the lens members 123A and 123B to form the lamp unit 120, and the lamp device 120A is integrated with the lens member 223A and 223B to form the lamp unit 220. However, the invention is not limited thereto. For example, the lamp device may not be integrated with the lens members. In this case, only the lamp device 20A or 120A may be replaced with new one when the lamp device 20A or 120A deteriorated.

Further, in the above-described embodiments, the direction in which the normal line H of the planar surface 23b is inclined is not limited to a specific direction, but it is preferable that the normal line H be inclined with respect to the lamp axis OA. Therefore, the direction in which the normal line H of the planar surface 23b is inclined is not limited to that shown in FIG. 1. For example, the normal line H of the planar surface 23b may be inclined in all directions.

Furthermore, in the above-described embodiments, the lamp body 21 is encased in an airtight housing composed of the holding member 18 and the lamp holder 17, but the invention is not limited thereto. For example, the housing may be omitted.

Further, in the above-described embodiments, the illuminating device is applied to a transmissive projector, but the invention is not limited thereto. For example, the illuminating device may also be applied to a reflective projector. The term 'transmissive type' means that a light valve including a liquid crystal display panel transmits light, and the term 'reflective type' means that the light valve reflects light. A DMD (digital micromirror display) may be used instead of the liquid crystal display panel. The number of light valves, such as liquid crystal display panels, is not limited to 3. For example, even when a single light valve, such as a liquid crystal display panel, is used to project a color image, the light source lamp unit 20 and the illumination optical system 30 can illuminate the light value.

Projectors are classified into a front projector that projects an image on a screen in a direction in which a viewer views a projection surface and a rear projector that projects an image on a screen in a direction opposite to the direction in which a viewer views a projection surface. The structure of the projector 10 shown in FIG. 1 can be applied to both the front projector and the rear projector.

The priority applications Numbers JP2006-088299 upon which this patent application is based is hereby incorporated by reference. While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An illuminating device comprising:
    a lamp device that includes a lamp body, which is a light source, and a concave reflector that is an ellipsoidal reflector that reflects light emitted from the lamp body to converge; and
    a lens member that has a planar optical surface and a nonplanar optical surface opposite to the planar optical surface and is provided on an emission side of the lamp device, wherein the lens member is a lens that collimates the light reflected from the ellipsoidal reflector,
    wherein the lens member is arranged such that a normal line of the planar optical surface is slightly inclined at a predetermined angle with respect to an optical axis of the lamp device,
    wherein the nonplanar optical surface of the lens member is a concave surface, and
    the concave surface is arranged closer to the ellipsoidal reflector than the planar optical surface,
    the lens member is arranged such that light beams substantially parallel to the optical axis are incident on the planar optical surface, and
    a filter that reflects at least one of an ultraviolet ray and an infrared ray is provided on the planar optical surface.

2. The illuminating device according to claim 1, wherein the predetermined angle is in a range of 1° to 13°.

3. The illuminating device according to claim 1, further comprising:
    a housing that holds the lamp device and the lens member and shields a space between the lamp device and the lens member from the outside.

4. A projector comprising:
    the illuminating device according to claim 1;

a light modulating device that modulates illumination light emitted from the illuminating device to form an optical image; and a projection optical system that projects the optical image formed by the light modulating device.

5. The projector according to claim 4, wherein the predetermined angle is in a range of 1° to 13°.

6. The projector according to claim 4, further comprising:

a housing that holds the lamp device and the lens member and shields a space between the lamp device and the lens member from the outside.

7. An illuminating device comprising:

a lamp device that includes a lamp body, which is a light source, and a concave reflector that is a paraboloidal reflector that reflects light emitted from the lamp body to travel as parallel light, a lens member that has a planar optical surface and a nonplanar optical surface opposite to the planar optical surface and is provided on an emission side of the lamp device, wherein the lens member is a lens that condenses the parallel light reflected from the paraboloidal reflector, and the lens member is arranged such that a normal line of the planar optical surface is slightly inclined at a predetermined angle with respect to an optical axis of the lamp device, the nonplanar optical surface of the lens member is a convex surface, and the planar optical surface is arranged closer to the paraboloidal reflector than the convex optical surface, the lens member is arranged such that light beams substantially parallel to the optical axis are incident on the planar optical surface, and a filter that reflects at least one of an ultraviolet ray and an infrared ray is provided on the planar optical surface.

8. A projector comprising:

the illuminating device according to claim 7;

a light modulating device that modulates illumination light emitted from the illuminating device to form an optical image, and a projection optical system that projects the optical image formed by the light modulating device.

9. An illuminating device comprising:

a lamp device that includes a lamp body, which is a light source, and a concave reflector that is a paraboloidal reflector that reflects light emitted from the lamp body to travel as parallel light, a plano-convex lens provided on an emission side of the concave reflector, the plano-convex lens condenses the parallel light reflected from the paraboloidal reflector, a lens member that has a planar optical surface and a nonplanar optical surface opposite to the planar optical surface and is provided on an emission side of the lamp device, wherein the lens member is arranged such that a normal line of the planar optical surface is slightly inclined at a predetermined angle with respect to an optical axis of the lamp device, the lens member is a lens that collimates the light condensed by the plano-convex lens, and is arranged on an emission side of the plano-convex lens, the nonplanar optical surface of the lens member is a concave surface, and the concave surface is arranged closer to the piano-convex lens than the planar optical surface, the lens member is arranged such that light beams substantially parallel to the optical axis are incident on the planar optical surface, and a filter that reflects at least one of an ultraviolet ray and an infrared ray is provided on the planar optical surface.

10. A projector comprising:

the illuminating device according to claim 9;

a light modulating device that modulates illumination light emitted from the illuminating device to form an optical image; and a projection optical system that projects the optical image formed by the light modulating device.

* * * * *